Dec. 19, 1961  E. D. ZELTWANGER  3,013,618
GAUGE WHEEL ATTACHMENT FOR TRACTOR MOUNTED TWO-WAY PLOWS
Filed Sept. 18, 1959  2 Sheets-Sheet 1

INVENTOR.
Earl D. Zeltwanger
By: Paul J. Rose Jr. atty.

Dec. 19, 1961 E. D. ZELTWANGER 3,013,618
GAUGE WHEEL ATTACHMENT FOR TRACTOR MOUNTED TWO-WAY PLOWS
Filed Sept. 18, 1959 2 Sheets-Sheet 2
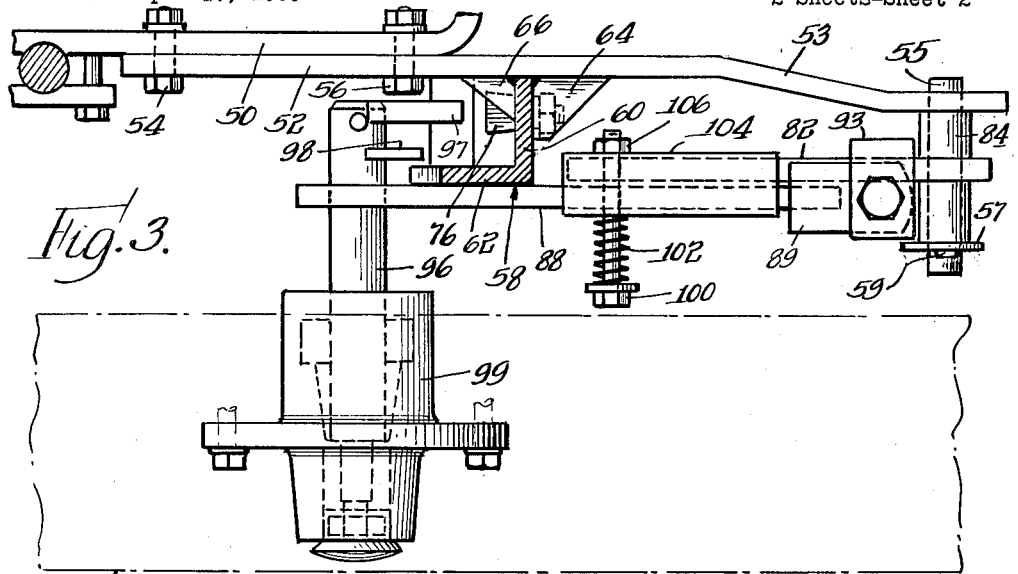
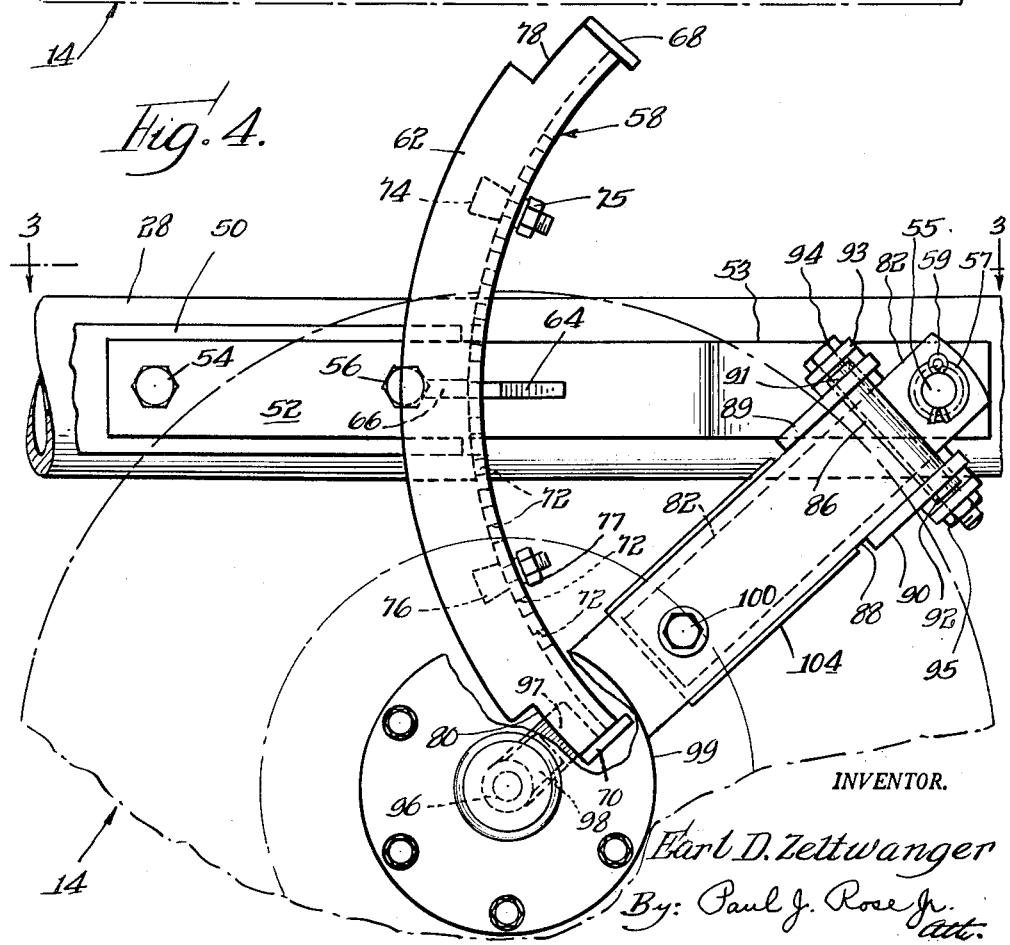
INVENTOR.
Earl D. Zeltwanger
By: Paul J. Rose Jr.
att.

United States Patent Office 3,013,618
Patented Dec. 19, 1961

3,013,618
GAUGE WHEEL ATTACHMENT FOR TRACTOR MOUNTED TWO-WAY PLOWS
Earl D. Zeltwanger, Mishawaka, Ind., assignor, by mesne assignments, to Oliver Corporation, Chicago, Ill., a corporation of Delaware
Filed Sept. 18, 1959, Ser. No. 840,913
3 Claims. (Cl. 172—212)

This invention relates to gauge wheels for tractor mounted two-way plows.

The object of the invention is to provide an improved gauge wheel attachment for tracter-mounted two-way plows.

Another object of the invention is to provide a gauge wheel attachment for tractor mounted two-way plows which is simple and economical to manufacture.

A further object of the invention is to provide a compact, self-contained gauge wheel attachment for tractor mounted two-way plows which may be completely attached as a unit to the frame of the two-way plow by merely two bolts.

These and other objects of the invention will appear from time to time as the following specification proceeds and with reference to the accompanying drawings wherein:

FIGURE 3 is a view of the gauge wheel attachment taken substantially along the line 3—3 of FIGURE 4; and FIGURE 4 is a view of the gauge wheel attachment in elevation, with the wheel and tire shown in dotted lines.

Figure 1:
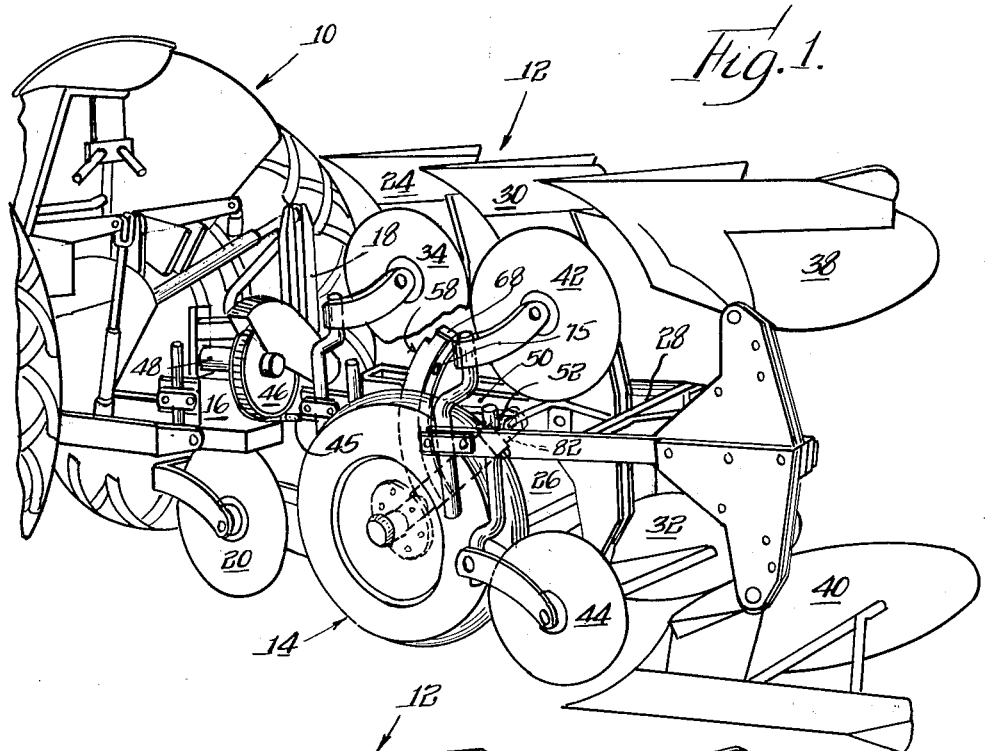
FIGURE 1 is a perspective view of a tractor mounted two-way plow having a gauge wheel attachment constructed in accordance with the invention.
Figure 2:
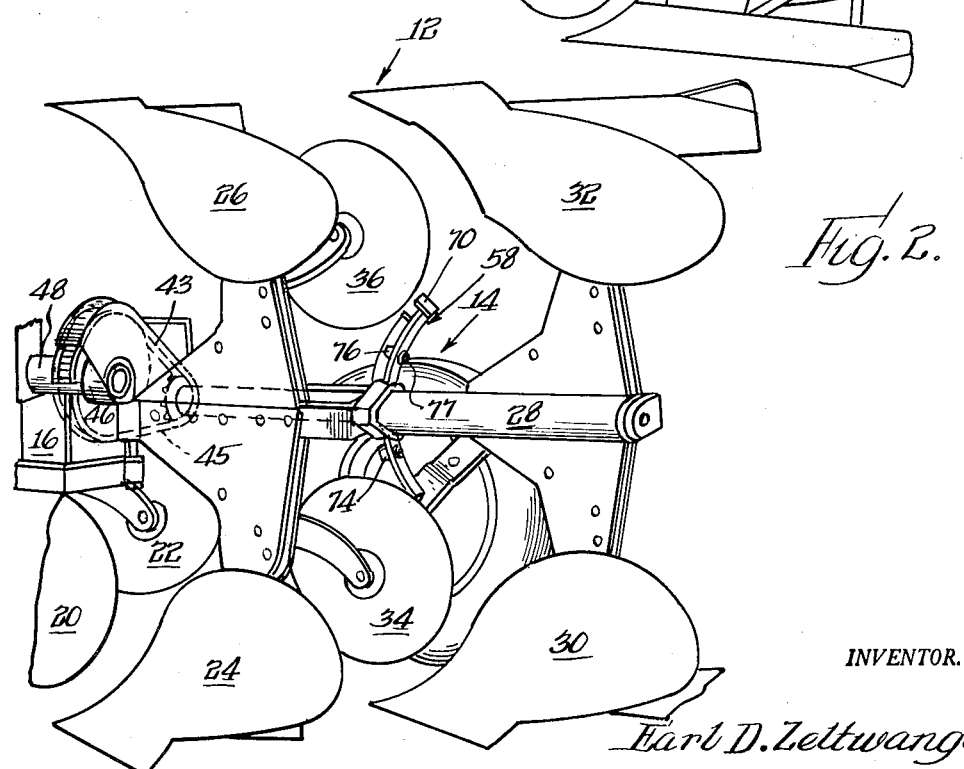
FIGURE 2 is an enlarged perspective view similar to FIGURE 1, but with the two-way plow rotated through 180 degrees and one set of plow bottoms removed.

In FIGURE 1, the tractor is generally indicated by the numeral 10; the two-way plow, by the numeral 12; and the gauge wheel attachment by the numeral 14. The two-way plow 12 is adapted to be supported from a conventional three point hitch of a tractor and includes a fabricated cross member 16 pivotally connected at its ends to the two lower links of the hitch and supporting a post 18 centrally of its ends for pivotal connection to the upper link of the hitch. A pair of coulters 20, 22 (FIGURES 1 and 2) is suitably mounted in brackets extending from cross member 16. The coulter 20 cuts the soil in front of a left-hand plow bottom 24 when it is in operating position as shown in FIGURE 2. The coulter 22 cuts the soil in front of a right-hand plow bottom 26, which is in operating position in FIGURE 1 but not clearly shown.

The cross member 16 also supports centrally thereof a cylindrical beam (not shown) on which a sleeve 28 (FIGURE 2) is mounted. Supporting framework secured to sleeve 28 is provided to mount plow bottoms 24, 26, 30, and 32, coulter 34 for plow bottom 30, coulter 36 for plow bottom 32, and the gauge wheel attachment 14. Additional framework secured to sleeve 28 may be provided, as in FIGURE 1, to mount additional plow bottoms 38 and 40, and coulters 42 and 44 therefor. Sleeve 28 is rotatable through 180 degrees to bring the gang of left-hand plow bottoms 24, 30, and 38, and coulters 34 and 42, into working position in one position of sleeve 28, and to bring the gang of right-hand plow bottoms 26, 32, and 40, and coulters 36 and 44, into working position in another position of sleeve 28. The gauge wheel attachment 14 is also rotatable through 180 degrees with the sleeve 28, and operates with either gang of plow bottoms. Adjustable stops (not shown) prevent the rotation of sleeve 28 past the working positions of the two gangs of plow bottoms, and the arrangement is such that as sleeve 28 is rotated from one extreme position to the other, the gauge wheel attachment swings beneath shaft 28. It will be understood that the two-way plow 12 is raised and tilted by the three point hitch of the tractor 10 before sleeve 28 and all the attachments thereto are rotated.

The sleeve 28 may be driven by chain segments 43, 45 secured at one end directly to sleeve 28 and at the other end to a driving member 46 mounted on an axle supported in a sleeve 48 mounted on cross member 16. A crank arm on the axle for driving member 16 may be driven by the piston rod of a hydraulic actuator (not shown) supported by brackets on cross member 16. Driving member 46 need be rotated only through a small arc in order to rotate sleeve 28 through 180 degrees, due to the difference in diameters.

The gauge wheel attachment 14, which is the subject of the invention, is shown more clearly in FIGURES 3 and 4, wherein numeral 50 indicates a portion of the framework attached to sleeve 28. An elongated supporting member 52 of the gauge wheel attachment 14, having an offset as indicated at 53, is attached to the frame 50 by two bolts 54, 56, in such a manner that, when sleeve 28 is horizontal and in one of its extreme angular positions in which one gang of plow bottoms is in working position, a horizontal plane through the axis of sleeve 28 will contain the long axis of supporting member 52.

Welded to supporting member 52 is an arcuate track member 58 which might be thought of as a piece of curved angle iron having side portions 60, 62 at right angles to each other. Side 60 can be considered a part of a hollow right circular cylinder and side 62 can be considered a flange thereon. The thin, outer edge of side 60 is welded to supporting member 52 in such a manner that side 62 is spaced from supporting member 52. Gussets 64 and 66 are welded to opposite sides of side 60 and joined to supporting member 52 to provide additional strength. The opposite ends of track member 58 are provided with stops 68, 70 welded to sides 60 and 62. A series of holes 72 is provided longitudinally along side 60 of track member 58 to provide mountings for a pair of adjustable stops 74, 76, which are threaded bolts with enlarged heads secured to side 60 with nuts 75, 77 and lock washers. Side 62 is cut away at opposite ends as indicated at 78, 80.

A shaft 55 is welded in a hole in the end of supporting member 52 adjacent the offset 53. The shaft 55, supporting member 52, and track member 58 may be called a welded track assembly.

Mounted on shaft 55 is a welded pivot assembly including an arm 82, a sleeve 84 welded in a hole at one end of arm 82 and mounted on shaft 55, and a sleeve 86 welded to a side of arm 82 transversely thereof and serving as a mounting for a welded gauge wheel arm assembly to be described. The sleeve 84, along with arm 82 and everything attached thereto, pivots on shaft 55 and is retained thereon at one end by supporting member 52 and at the other end by a washer 57 and cotter pin 59.

The welded gauge wheel arm assembly includes an arm 88 having a pair of ears 89, 90 welded thereto adjacent one end on opposite narrow faces thereof. The ears 89 and 90 are provided with holes for the reception of bushings 91 and 92 respectively. A C-shaped member 93 having bolt holes in the bent-over ends thereof is provided, and a bolt 94 is inserted through one end of C-shaped member 93, through bushing 91, sleeve 86, bushing 92, and through the other end of C-shaped member 93. A nut 95 is provided on the threaded end of bolt 94. The arm 88 is thus pivotable about bolt 94, through ears 89 and 90 with their bushings 91 and 92.

The welded gauge wheel arm assembly, besides arm 88 and ears 89 and 90, also includes a shaft 96 welded in a hole at the other end of arm 88, a large lug 97 welded on the end of shaft 96 projecting toward supporting member 52, and a smaller lug 98 welded to the shaft 96 between lug 97 and arm 88. A wheel hub 99 is suitably mounted on the other end of shaft 96.

Holes are provided in the end of arm 82 opposite sleeve 84 and in arm 88 between the ends thereof for the reception of a bolt 100 having a spring 102 thereon for urging arm 88 toward arm 82. The hole in arm 88 is made a little larger than the bolt in order to provide enough clearance for limited pivotal movement of arm 88 away from arm 82. The bolt 100 also serves to hold a C-shaped shield 104 in place, to prevent anything from lodging between arms 82 and 88 when they are pivoted away from each other. A nut 106 is provided on the threaded end of bolt 100.

Assume that the two-way plow 12 has been raised by the tractor 10, but that the gang of right-hand plow bottoms is in working position as far as the angular position of sleeve 28 is concerned. The parts of gauge wheel attachment 14 will then be in the position shown in FIGURE 4. If the two-way plow 12 is then lowered by the tractor, the tire on gauge wheel attachment 14 will hit the ground and be raised with respect to track 58 as the two-way plow 12 is further lowered. Lug 97 will finally engage adjustable stop 76 to prevent further lowering of two-way plow 12 and establish the working depth of the plow bottoms, and lug 98 will maintain lug 97 in alignment with stop 76 by contacting side 62 of arcuate track member 58 and preventing any further swinging of arm 88 away from arm 82 due to any possible side thrust on the tire.

Assume now that it is desired to rotate sleeve 28 to bring the gang of left-hand plow bottoms into working position. The two-way plow 12 will be raised by the tractor 10 until the tire of the gauge wheel attachment 14 clears the ground, the tire and arms 82 and 88 pivoting about shaft 55 until lug 97 hits end stop 70, as shown in FIGURE 4. Sleeve 28 will then be rotated 180 degrees counter-clockwise as viewed from the rear in FIGURE 1. By the time sleeve 28 has been rotated 90 degrees and the tire of gauge wheel attachment 14 is substantially horizontal under sleeve 28, the weight of the tire will have caused arm 88 to pivot about bolt 94 against the force of spring 102 until lug 97 engages side 62, the smaller lug 98 having passed over side 62 through the cut-away portion 80 thereof. As the sleeve 28 is rotated through the second 90 degrees to bring the tire of gauge wheel attachment 14 into vertical position on the right hand side of tractor 10 and bring the gang of left-hand plow bottoms down into working position, the weight of the tire will cause arms 82 and 88 to pivot about shaft 55 throughout the length of track member 58 until lug 97 engages end stop 68. During this movement, side 62 of track member 58 is between lugs 97 and 98, and lug 97 is out of alignment with adjustable stops 74 and 76, so as to be able to pass by them, but at the end of the movement, as lug 97 engages end stop 68, spring 102 will cause arm 88 to pivot about bolt 94 as the weight of the tire is no longer acting against the spring, and lug 97 will be brought into alignment with stop 74, lug 98 passing over side 62 through cut-away portion 78. The two-way plow 12 may then be lowered by the tractor, and after the tire hits the ground, further lowering of two-way plow 12 will pivot arms 82 and 88 about shaft 55 and raise the tire with respect to track member 58 until lug 97 engages adjustable stop 74 to prevent any further lowering of two-way plow 12 and establish the working depth of the gang of left-hand plow bottoms. Lug 98 will prevent arm 88 from swinging too far away from arm 82 due to any possible side thrust on the tire, thus maintaining lug 97 in alignment with stop 74.

To increase the plowing depth, stops 74 and 76 are moved closer together. To decrease plowing depth, stop 74 is moved toward end stop 68 and stop 76 is moved toward end stop 70.

From the above description, it will be understood what happens when the two-way plow 12 is rotated back again to bring the gang of right-hand plow bottoms into working position. It will also be noted that FIGURE 3 shows the device in a position which it would not normally assume. Arms 82 and 88 have been swung up parallel to the plane of the paper without first swinging arm 88 away from arm 82 to move lug 98 through cutaway portion 80 and enable lug 97 to pass stop 76. In order for the device to attain the position shown, stop 74 or 76 would first have to be removed, and then replaced after arms 82 and 88 had been swung by. This would not be done in practice, but the device has been shown in this manner for the sake of convenience and ease of understanding.

It will be seen that I have provided a compact, self-contained gauge wheel attachment for tractor mounted two-way plows which may be completely attached to the frame of a two-way plow by merely two bolts and nuts. It will be understood that variations and modifications may be made without departing from the spirit and scope of the invention.

The invention is claimed as follows:

1. A gauge wheel attachment for tractor mounted two-way plows comprising a supporting member adaptable to be connected to the frame of a two-way plow, a curved track member secured to said supporting member transversely thereof and having a forwardly extending flange portion spaced from said supporting member, a pair of fixed end stops on said curved track member, a pair of adjustable stops on said curved track member between said end stops, said adjustable stops being smaller than said end stops transversely of said curved track member, a wheel shaft having a lug adjacent one end and adapted to have a wheel mounted on the other end, and double pivotal mounting means for suspending said wheel shaft from said supporting member to space the wheel end thereof outwardly from said supporting member and the lug end thereof adjacent said curved track member intermediate said supporting member and said flange portion of said track member, said double pivotal mounting means enabling said wheel shaft to be pivoted transversely of said curved track member to move said lug into and out of alignment with said adjustable stops with engagement of said lug against said flange portion of said track member limiting the outward pivoting movement thereof and said double pivotal mounting means enabling said wheel shaft to be pivoted longitudinally of said curved track member to move said lug along said curved track member from one end stop to the other when said lug is out of alignment with said adjustable stops in abutting engagement with said flange portion and between an end stop and the adjacent adjustable stop when said lug is in alignment with said adjustable stops, and co-acting means on said flange portion and said wheel shaft permitting movement of said lug between its position in alignment with said adjustable stops and its position in abutting engagement with said flange portion only when said lug is disposed at either end of said track member against one of said fixed end stops.

2. A gauge wheel attachment for tractor mounted two-way plows comprising an elongated supporting member adaptable to be connected to the frame of a two-way plow, an arcuately curved track member secured to said elongated supporting member transversely thereof, said track member having a first portion substantially in the shape of part of a hollow right circular cylinder and a flange portion thereon spaced from said elongated supporting member and having peripheral portions cut away at opposite ends thereof, a pair of fixed end stops on said track member, a pair of adjustable stops removably and adjustably secured to said first portion of said track member in such a manner as to be spaced from said flange portion and spaced from each other along said first portion between the cut-away portions at the ends of said flange portion, a first arm pivotally connected to said elongated supporting member and having its pivotal axis at the center of curvature of said track member, a second arm pivotally connected to said first arm and having its pivotal axis extending perpendicularly to the pivotal axis of said first arm on said elongated supporting member, and a wheel shaft carried by said second arm and having a first lug adjacent one end and a second smaller lug spaced along said shaft from said first lug, said first arm being pivotable to move said lugs longitudinally of said track member, said second arm being pivotable to move said first and second lugs transversely of said track member, said second lug being selectively slidable along the inner and outer surfaces of said flange portion intermediate the cut-away end portions thereof during pivoting movement of said first arm and being movable through said cut-away end portions transversely of said flange portion between positions on opposite sides of said flange portion during pivoting movement of said second arm, outward pivoting movement of said second arm being limited by engagement of said first lug with the inner surface of said flange portion and the outer limits of the pivoting movement of said first arm being determined by engagement of said first lug with said fixed end stops, said second lug when disposed adjacent the inner surface of said flange portion serving to retain said first lug in alignment with said adjustable stops whereby longitudinal movement of said first lug is limited to movement between either one of said adjustable stops and the fixed end stop adjacent thereto, said second lug when disposed adjacent the outer surface of said flange portion serving to retain said first lug away from alignment with said adjustable lugs whereby said first lug is longitudinally movable between said fixed end stops past said adjustable stops, said arrangement of parts insuring against said first lug ever being disposed between said pair of adjustable stops in alignment therewith.

3. A gauge wheel attachment as claimed in claim 2, including spring means operatively connected between said arms and urging said second arm toward said first arm to normally maintain said first lug in alignment with said adjustable stops.

References Cited in the file of this patent

UNITED STATES PATENTS

| | | |
|---|---|---|
| 2,773,439 | Chandler | Dec. 11, 1956 |
| 2,959,232 | Gordon | Nov. 8, 1960 |

UNITED STATES PATENT OFFICE
CERTIFICATE OF CORRECTION

Patent No. 3,013,618                      December 19, 1961

Earl D. Zeltwanger

It is hereby certified that error appears in the above numbered patent requiring correction and that the said Letters Patent should read as corrected below.

Column 2, line 12, for "16" read -- 46 --; column 4, lines 29 and 30, for "transverly" read -- transversely --.

Signed and sealed this 19th day of June 1962.

(SEAL)
Attest:

ERNEST W. SWIDER
Attesting Officer

DAVID L. LADD
Commissioner of Patents